United States Patent
Bassetti

[11] Patent Number: 5,665,411
[45] Date of Patent: Sep. 9, 1997

[54] METHOD OF PACKAGING AND MICROWAVING SWEET POTATO

[76] Inventor: Robert P. Bassetti, 2778 NC 50 South, Benson, N.C. 27504

[21] Appl. No.: 407,119

[22] Filed: Mar. 20, 1995

[51] Int. Cl.$^6$ .................. B65B 25/22; A23L 3/00
[52] U.S. Cl. .................. 426/234; 426/412; 426/415; 426/419
[58] Field of Search .................. 426/419, 415, 426/412, 234, 637

[56] References Cited

U.S. PATENT DOCUMENTS

| | | | |
|---|---|---|---|
| 2,168,651 | 8/1939 | McCoy | 426/412 |
| 2,452,174 | 10/1948 | Arnold | 426/415 |
| 2,480,679 | 8/1949 | Spencer | 426/234 |
| 3,450,543 | 6/1969 | Badran et al. | 426/415 |
| 3,630,759 | 12/1971 | Rumberger | 426/412 |
| 3,658,559 | 4/1972 | Mohwinkel | 426/412 |
| 3,672,907 | 6/1972 | Hudson | 426/412 |
| 4,061,785 | 12/1977 | Nishino | 426/419 |
| 4,135,003 | 1/1979 | Mohwinkel | 426/412 |
| 4,411,921 | 10/1983 | Woodruff | 426/419 |
| 4,553,373 | 11/1985 | Viitanen et al. | 426/419 |
| 4,985,300 | 1/1991 | Huang | 426/392 |
| 5,002,786 | 3/1991 | Neese | 426/419 |
| 5,221,548 | 6/1993 | Walton | 426/412 |
| 5,254,354 | 10/1993 | Stewart | 426/419 |

*Primary Examiner*—Steven Weinstein
*Attorney, Agent, or Firm*—Rhodes, Coats & Bennett, LLP

[57] ABSTRACT

The present invention relates to a sweet potato that is individually packaged after curing for market and actual cooking. After the sweet potato has been harvested, cleaned and cured, it is then individually packaged by wrapping a heat-shrinkable plastic film around the potato. The wrapped potato is then subjected to heat and the plastic film is heat-shrunk around the entire sweet potato and forms a tightly bound plastic film around the entire sweet potato. This plastic film protects the sweet potato during transport and preserves the quality of the sweet potato for an extended time period. Lastly, the individually wrapped sweet potato is ready for immediate microwaving while contained within the same heat-shrunk plastic wrap.

3 Claims, 1 Drawing Sheet

METHOD OF PACKAGING AND MICROWAVING SWEET POTATO

FIELD OF INVENTION

The present invention relates to sweet potatoes, and more particularly to a prepackaged sweet potato wherein the package serves to protect and preserve the sweet potato as well as provide a container or wrapping for the sweet potato while the same is being cooked.

BACKGROUND OF THE INVENTION

Sweet potatoes are one of the most nutritional vegetables produced today. Sweet potatoes are widely accepted throughout the United States and the world. However, sweet potatoes are very sensitive to handling conditions as well as environmental conditions and for those reasons, it is often difficult to provide a healthy and fresh sweet potato at the retail level. It is not uncommon to find sweet potatoes within a grocery store that are withered and dry and therefore not "fresh". When cooked, these potatoes tend to be dry and fail to yield an acceptable taste.

Typically, sweet potatoes after harvest, are cleaned and then cured and stored until they are ready to be transported to market. Once a sweet potato has been removed from storage and transported to points of distribution and ultimately to retail grocery outlets, the sweet potato has been subjected to handling which sometimes results in the sweet potato being bruised and also during the period of time, the sweet potato through respiration begins to loose its moisture content. In turn, the loss of moisture content in the sweet potato results in the same loosing freshness and taste.

Related to the above concerns and problems with sweet potatoes, is the problem concerning sweet potato shelf life. Because sweet potatoes tend to loose their moisture content, it is well-known that some varieties of sweet potatoes have a relatively short shelf life. This, of course, results in the loss of substantial quantities of sweet potatoes and obviously reduces the return of the retailers and wholesalers.

Therefore, there is a need to increase the shelf life of sweet potatoes and to preserve their quality, freshness and overall appearance for a sufficient time period to enable the sweet potatoes to be transported to retail outlets and displayed for the consumer.

SUMMARY AND OBJECTS OF THE INVENTION

The present invention entails a sweet potato that is packaged or prepackaged to overcome the problems and drawbacks associated with maintaining a high overall quality of sweet potato over a substantial time period. The present invention entails a packaging process and method that protects the sweet potato from bruises, scrapes and cuts, especially during the time that the sweet potato is being transported from a storage facility to a retail market. Further, the same packaging process enables the sweet potato to be cooked in a microwave oven while packaged in the same package.

Therefore, the present invention entails a packaged sweet potato wherein the sweet potato is wrapped within a plastic heat-shrinkable film and the plastic film is shrunk to the sweet potato such that it tightly adheres around the sweet potato. The plastic film protects the sweet potato and also maintains the sweet potato in a fresh state for extended periods of time. In the end, the packaged sweet potato increases the shelf life of the sweet potato and yields a sweet potato that is tasty and moist.

It is therefore an object of the present invention to provide a method of packaging a sweet potato that will increase the shelf life of the sweet potato.

Another object of the present invention is to provide a multi-purpose package for individual sweet potatoes that will protect and increase the shelf life of the sweet potato and which will also provide a packaged medium for actually cooking the sweet potato.

Another object of the present invention resides in the provision of a method for packaging a sweet potato of the character referred to above wherein the resulting package will enable the sweet potato to respire and for there to be an exchange of oxygen and carbon dioxide across the package structure.

Other objects and advantages of the present invention will become apparent and obvious from a study of the following description and the accompanying drawings which are merely illustrative of such invention.

DETAILED DESCRIPTION OF THE INVENTION

Figure 1:
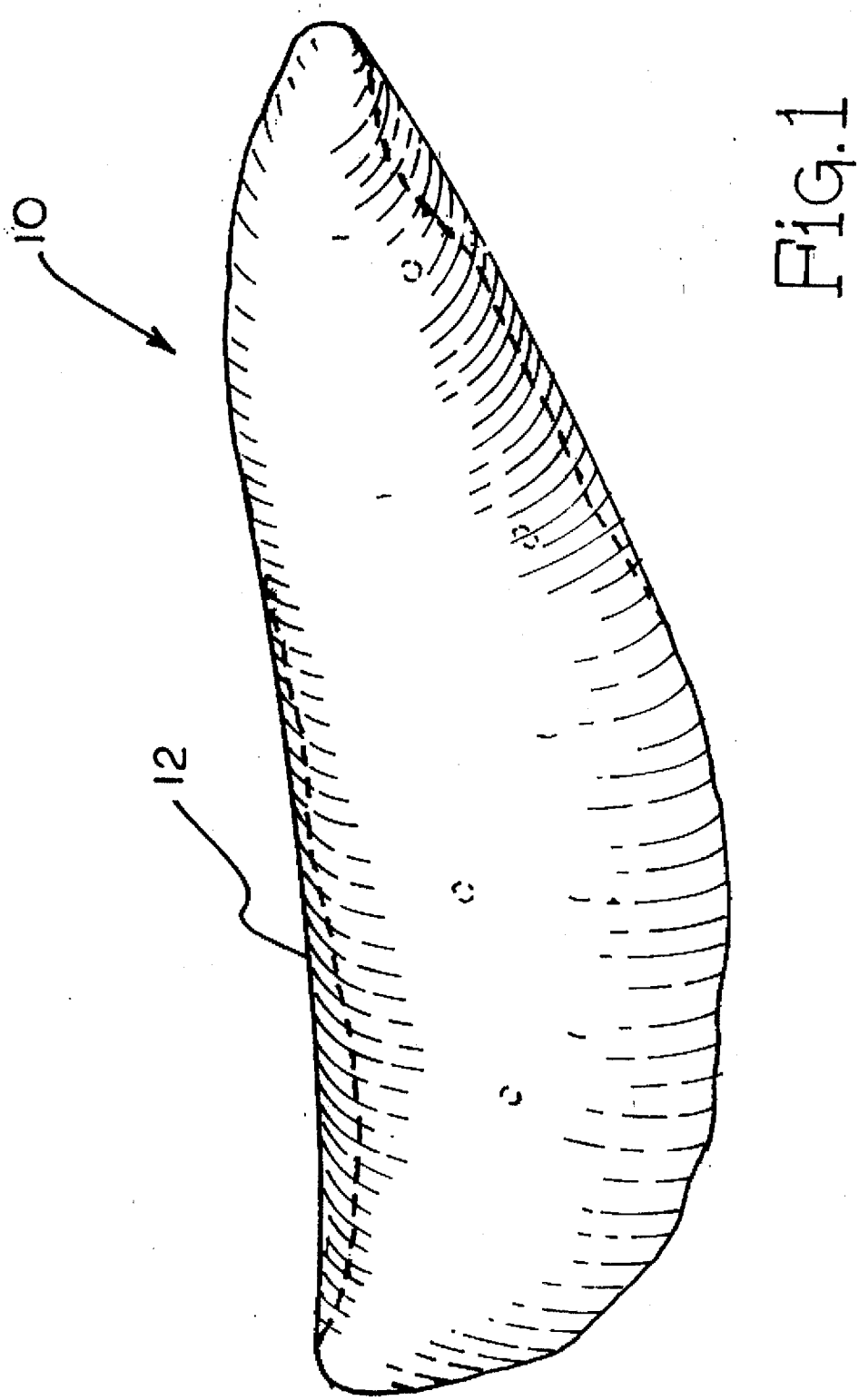
FIG. 1 is a view of a sweet potato having a heat-shrinkable plastic wrap secured to and around the sweet potato.

The present invention entails a packaged sweet potato product wherein the package protects the sweet potato during transport, preserves freshness, and serves as a packaging medium during cooking. This is achieved by wrapping each sweet potato individually with a plastic film and then heat-shrinking the film to the sweet potato such that the sweet potato is encompassed by the heat-shrunk plastic film.

After sweet potatoes are harvested, they are typically cleaned and thereafter are subjected to a curing or conditioning process. In this regard, sweet potatoes are typically housed in a low-light area and maintained in environmental conditions of approximately 58° F. And 85% relative humidity.

After the sweet potatoes have been cured and prior to transporting to market, the present invention entails packaging the sweet potatoes individually in a plastic heat-shrinkable film. In this regard, the plastic film is wrapped around the sweet potato and appropriately cut. Thereafter, the wrapped sweet potato is transferred to a heat tunnel where heat is applied causing the plastic film to shrink around the sweet potato to form a heat-shrunk plastic film that surrounds the entire sweet potato. Prior to shrinking, and during the course of prewrapping the sweet potato it is desirable to provide at least one small air opening to allow air to escape from the wrapped film while the sweet potato is being subjected to the heat-shrinking process. During the heat-shrinking process, the plastic film is tightly shrunk such that it closely adheres to the sweet potato around substantially the entire surface area of the sweet potato. Thereafter, any excess plastic film can be trimmed from the sweet potato so as to provide a relatively smooth type plastic film that surrounds the entire sweet potato.

The thickness of the plastic film used for packaging the sweet potato can vary. A preferred film thickness would range between 0.060 inches and 0.075 inches. Also, the film selected should be air-permeable in order that oxygen and carbon dioxide can be transferred through the walls of the film. This, of course, allows the sweet potato to continue to breathe after packaging.

Thus, it is appreciated that the heat-shrunk plastic film provides a protective packaging for the sweet potato that protects the same during transport and handling as the sweet potato is transferred from a storage or curing site to distribution points and retail grocery store outlets. In addition, the same plastic film preserves the freshness of the sweet potato by preventing excessive moisture from departing the sweet potato. Thus, the plastic film surrounding the sweet potato maintains the sweet potato fresh, moist and effectively results in the sweet potato retaining a juicy and sweet taste.

In addition to protecting the sweet potato and extending the shelf life of the sweet potato, the packaging process of the present invention serves to contain and package the sweet potato during microwave cooking. Once the sweet potato is purchased at a grocery store or other retail outlet, the same is ready for direct cooking. There is no need to wash or prepare the potato in any respect. The entire potato and package is placed in a microwave oven and cooked on a high temperature selection for approximately 8 to 12 minutes. Once the sweet potato has been cooked, it is allowed to cool and the plastic heat-shrunk film is removed from the potato. Now, the sweet potato is ready to be consumed.

Turning to FIG. 1, the sweet potato product of the present invention is shown therein and indicated generally by the numeral 10. The sweet potato includes the heat-shrunk plastic film 12 that surrounds the entire potato. As indicated above, the plastic film 12 is air-permeable which allows air to be transferred across the plastic film itself. This, of course, allows the sweet potato to breathe and for oxygen and carbon dioxide to be transferred to and from the potato.

From the forgoing specification and discussion, it is seen that the present invention entails a new method for packaging and handling sweet potatoes via heat-shrunk plastic film that protects and preserves the shelf life of the sweet potato as well as serving as a medium for microwave cooking.

The present invention may, of course, be carried out in other specific ways than those herein set forth without parting from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of packaging, protecting, preserving, and microwaving a sweet potato wherein only one package serves to protect and preserve the sweet potato as well as to containerize the same for microwaving, comprising the steps of: after harvesting and cleaning the sweet potato, but prior to transporting it to market, wrapping the sweet potato individually within an air permeable, heat-shrinkable plastic film that is sufficiently air permeable to allow an exchange of oxygen and carbon dioxide through the film to enable the wrapped sweet potato to continue to respire while at the same time preventing excessive moisture loss from the wrapped sweet potato to prevent withering and drying of the sweet potato; said film being capable of allowing said sweet potato to be cooked in said film in a microwave oven; then heating and shrinking the plastic film around the entire sweet potato such that the plastic film is tightly bound around the entire sweet potato; transporting the shrink-wrapped sweet potato from the wrapping site to market with the sweet potato remaining shrink-wrapped with the same plastic film during transport and at market such that the sweet potato is protected and respiration is accomodated by the same plastic film; and cooking the packaged sweet potato within the same individual heat-shrunk plastic film by placing the shrink-wrapped sweet potato in a microwave oven and cooking the same while being so wrapped.

2. The method of claim 1 including the step of curing the sweet potato before wrapping the sweet potato in the air-permeable plastic film.

3. The method of claim 1 wherein the air-permeable, microwavable plastic film has a thickness of approximately 0.060 to 0.075 inches.

* * * * *